(12) United States Patent
Verges (10) Patent No.: US 7,898,104 B1
(45) Date of Patent: Mar. 1, 2011

(54) APPARATUS AND METHOD FOR DYNAMICALLY BALANCING LOADING OF A POLYPHASE CIRCUIT

(75) Inventor: Christopher Verges, San Carlos, CA (US)

(73) Assignee: Cyber Switching, Inc., San Jose, CA (US)

( * ) Notice: Subject to any disclaimer, the term of this patent is extended or adjusted under 35 U.S.C. 154(b) by 322 days.

(21) Appl. No.: 12/330,475

(22) Filed: Dec. 8, 2008

(51) Int. Cl.
*H02J 3/26* (2006.01)
(52) U.S. Cl. .......................... 307/14; 307/115; 307/127
(58) Field of Classification Search .................. 307/14, 307/72, 80, 115, 271
See application file for complete search history.

(56) References Cited

U.S. PATENT DOCUMENTS

| | | | | |
|---|---|---|---|---|
| 6,628,009 B1 * | 9/2003 | Chapel | ......................... | 307/14 |
| 7,576,450 B2 * | 8/2009 | Kuo | ........................... | 307/115 |
| 7,732,940 B2 * | 6/2010 | Kim et al. | ..................... | 307/14 |

\* cited by examiner

*Primary Examiner*—Fritz M Fleming
(74) *Attorney, Agent, or Firm*—Michael W. Caldwell (57) ABSTRACT

A controller box comprises an array of switches for arbitrarily connecting loads to any selected power phase of a polyphase supply circuit. By evenly balancing the loads amongst the phases the efficiency of the total power delivered is thereby improved.

19 Claims, 6 Drawing Sheets

CASE 1

| | 310 | 312 | 314 | 316 | 318 | 320 | | 310 | 312 | 314 | 316 | 318 | 320 | | 310 | 312 | 314 | 316 | 318 | 320 |
|---|---|---|---|---|---|---|---|---|---|---|---|---|---|---|---|---|---|---|---|---|
| | 3 | 2 | 6 | 0 | 2 | 7 | | 3 | 2 | 6 | 0 | 2 | 7 | | 3 | 2 | 6 | 0 | 2 | 7 |
| | A (304) | | | | | | | B (306) | | | | | | | C (308) | | | | | |
| 310 | 1 | | | | | | | 1 | | | | | | | 1 | | | | | |
| 312 | | 1 | | | | | | | 1 | | | | | | | 1 | | | | |
| 314 | | | 1 | | | | | | | 1 | | | | | | | 1 | | | |
| 316 | | | | 0 | | | | | | | 0 | | | | | | | 0 | | |
| 318 | | | | | 1 | | | | | | | 1 | | | | | | | 1 | |
| 320 | | | | | | 1 | | | | | | | 1 | | | | | | | 1 |
| | 3 | 0 | 6 | 0 | 0 | 7 | | 3 | 2 | 0 | 0 | 2 | 0 | | 3 | 0 | 2 | 6 | 0 | 2 |

|   | A | B | C | |A-B| | |B-C| | |C-A| | Range |
|---|---|---|---|-------|-------|-------|-------|
|   | 16 | 7 | 17 | 9 | 10 | 1 | 20 |

CASE 2

| | 310 | 312 | 314 | 316 | 318 | 320 | | 310 | 312 | 314 | 316 | 318 | 320 | | 310 | 312 | 314 | 316 | 318 | 320 |
|---|---|---|---|---|---|---|---|---|---|---|---|---|---|---|---|---|---|---|---|---|
| | 3 | 2 | 6 | 0 | 2 | 7 | | 3 | 2 | 6 | 0 | 2 | 7 | | 3 | 2 | 6 | 0 | 2 | 7 |
| 310 | 1 | | | | | | | 1 | | | | | | | 1 | | | | | |
| 312 | | 1 | | | | | | | 1 | | | | | | | 1 | | | | |
| 314 | | | 1 | | | | | | | 1 | | | | | | | 1 | | | |
| 316 | | | | 0 | | | | | | | 0 | | | | | | | 0 | | |
| 318 | | | | | 1 | | | | | | | 1 | | | | | | | 1 | |
| 320 | | | | | | 1 | | | | | | | 1 | | | | | | | 1 |
| | 3 | 0 | 6 | 0 | 0 | 7 | | 3 | 2 | 6 | 0 | 2 | 0 | | 3 | 0 | 2 | 0 | 0 | 2 |

|   | A | B | C | |A-B| | |B-C| | |C-A| | Range |
|---|---|---|---|-------|-------|-------|-------|
|   | 16 | 13 | 11 | 3 | 2 | 5 | 10 |

CASE 3

| | 310 | 312 | 314 | 316 | 318 | 320 | | 310 | 312 | 314 | 316 | 318 | 320 | | 310 | 312 | 314 | 316 | 318 | 320 |
|---|---|---|---|---|---|---|---|---|---|---|---|---|---|---|---|---|---|---|---|---|
| | 3 | 2 | 6 | 0 | 2 | 7 | | 3 | 2 | 6 | 0 | 2 | 7 | | 3 | 2 | 6 | 0 | 2 | 7 |
| 310 | 1 | | | | | | | 1 | | | | | | | 1 | | | | | |
| 312 | | 1 | | | | | | | 1 | | | | | | | 1 | | | | |
| 314 | | | 1 | | | | | | | 1 | | | | | | | 1 | | | |
| 316 | | | | 0 | | | | | | | 0 | | | | | | | 0 | | |
| 318 | | | | | 1 | | | | | | | 1 | | | | | | | 1 | |
| 320 | | | | | | 1 | | | | | | | 1 | | | | | | | 1 |
| | 0 | 0 | 6 | 0 | 0 | 7 | | 3 | 2 | 6 | 0 | 2 | 0 | | 3 | 2 | 2 | 0 | 0 | 2 |

|   | A | B | C | |A-B| | |B-C| | |C-A| | Range |
|---|---|---|---|-------|-------|-------|-------|
|   | 13 | 13 | 14 | 0 | 1 | 1 | 2 |

<--- LOAD REFERENCE NUMBER
<--- LOAD CURRENT, Amps
<--- PHASE BUS

APPARATUS AND METHOD FOR DYNAMICALLY BALANCING LOADING OF A POLYPHASE CIRCUIT

BACKGROUND

Polyphase electricity is often used to distribute electricity of selectable voltage to various loads. For example, three-phase 120/208 volt AC electrical power is often provided to the residences in a neighborhood, wherein a given home is connected to two of the three phases plus a neutral circuit. A circuit breaker panel provides separate buses for each phase, wherein a first circuit breaker provides a protected series connection from one of the 110 VAC buses to a circuit on the premises. A second circuit breaker(s) may be connected to a second phase, also providing 110 VAC to its connected load. A different type of circuit breaker may connect across the two out-of-phase buses to provide 208 VAC to another load. Another residence may be connected in common to one of the phases, with the second phase provided to the residence being the phase that was not connected to the first residence. In a given area, many residences may be provided power by two of the three distributed phases. Ideally the various residence connections are such that the load in each phase, as seen by the grid, is approximately the same, a condition that can be shown to provide a more efficient use of the power provided. In a similar fashion, polyphase electrical power may be provided to buildings and businesses requiring more power than a personal residence. In such an installation a professional electrician may be retained to determine the various load requirements throughout the facility such that the assignment of loads to power buses is approximately balanced. However, equipment may be added to or removed from a circuit, causing a unbalanced condition. Similarly, various loads may be turned on or off during the course of a day, also causing a loss of balance. When the provided power is not balanced amongst all circuits (phases) there will be a net current through the neutral connection, causing a loss of efficiency. In addition, a given circuit will be constructed with a certain maximum design load and a circuit breaker of a slightly less maximum current rating provided in series. In the event that the power demands of a given circuit are in excess of the maximum rating of its associated circuit breaker, the circuit breaker will open the circuit, thus providing a safe condition. However, another circuit may have unneeded (excess) power available at the same time. From time to time a professional electrician may review the load conditions of the building and rebalance the loads. However, the rebalancing process requires that power be removed from the facility, a costly and inconvenient process, therefore owners may sometimes delay rebalancing from when it would first be beneficial. What is needed is an apparatus that can dynamically, selectively connect loads amongst a plurality of available power buses such that the loads in all circuits are balanced and that no individual circuit exceeds the maximum designed power for the circuit. Further, a method is needed for determining the best combination of circuits and loads wherein the apparatus may be controlled in response to the results of the method.

SUMMARY

According to the present invention, an outlet switch comprises control logic and controllable switches or relays. The switches are connected between two or more power lines, other switches, and output terminals to provide means for selecting which power phase and neutral, or which two power phases, are connected to each selectable load. A controller receives data concerning the instant demands of each load and uses logic to determine the most efficient combination of buses and loads while guarding that the load assigned to each bus is less than the design maximum for each bus, insofar as it is possible to prevent an overload. In some embodiments the outlet switch controller is connected to an external controller which provides instructions and certain parametric data to the outlet switch controller.

BRIEF DESCRIPTION OF THE DRAWINGS

PRIOR ART

DETAILED DESCRIPTION OF THE INVENTION

| Definition of some terms: | |
|---|---|
| Polyphase voltage | Alternating current electricity provided to two or more buses, the voltage of the two or more buses being out of phase with respect to each other. |
| ADC | Analog to Digital Converter; a common analog device for providing a digital word corresponding to an analog value. |
| VAC | Voltage in an alternating current system. All voltages herein are stated as RMS (root mean squared) values. |
| SCR | Silicon Controlled Rectifier. |
| Control box | Apparatus comprising a controller, switches, and interconnections for selectively connecting an output terminal to a power source. |

Figure 1:
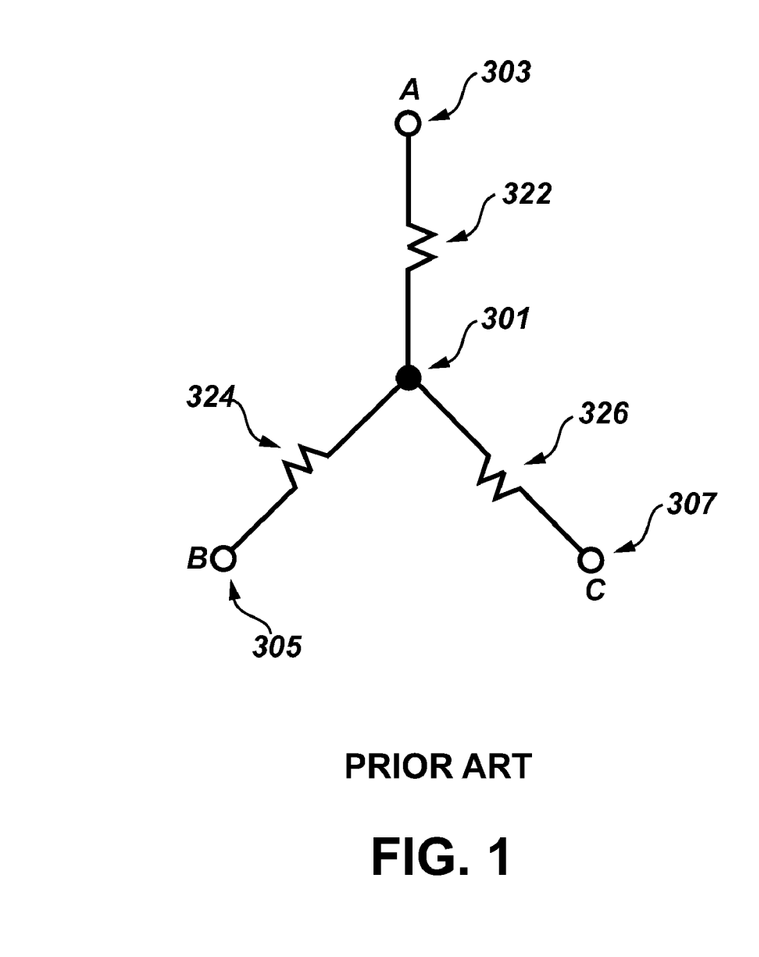
FIG. 1 is a wiring diagram of a wye configured circuit. PRIOR ART.

Looking to FIG. 1, power sources A 303, B 305, and C 307 are connected through loads to an electrically neutral point 301. The voltages of power sources A 303, B 305, and C 307 are approximately equal, out of phase by 360/3 degrees. This arrangement is customarily denominated a "wye" circuit configuration. In the United States the circuit of FIG. 1 typically provides 110 VAC to a load or loads. FIG. 1 also corresponds electrically to the FIG. 3 example of the connection of loads 7 (322), 8 (324) and 9 (326) to the power provided via lines 304, 306, and 308 respectively, through the loads to the neutral line 302. The lines from each power line 304, 306, 308 to each load (310 through 326 by twos) are not numbered but are shown. Ideally, the loads (current) are balanced such that the current on line A 304 equals the current on line B 306 which equals the current on line C 308. In such a case, the current through the neutral line 302 is zero. In an actual case, any differences in the loads causes a net current through the neutral line 302 which represents a loss of efficiency. Of course the loads are not necessarily individual (singular) loads but the summation of loads in that circuit. For example, load 7 (322) may be comprised of a computer bay, cooling fans in the computer bay, and data routers while load 8 (324) comprises lighting of a facility and load 9 (326) is a furnace blower. The actual loads in use are arbitrary to the present invention. The customary voltage in other countries may differ, but the principle of maximizing efficiency by balancing the loads still applies.

Figure 2:
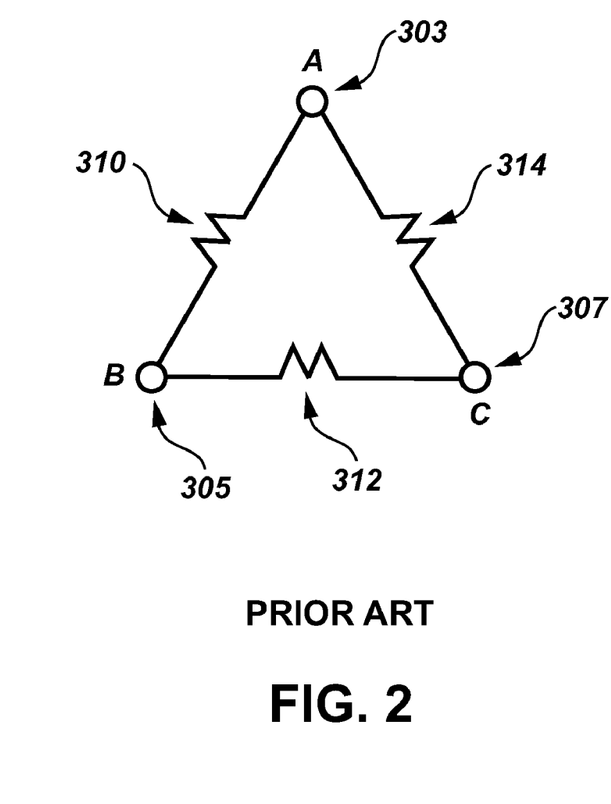
FIG. 2 is a wiring diagram of a delta configured circuit. PRIOR ART.
Figure 3:
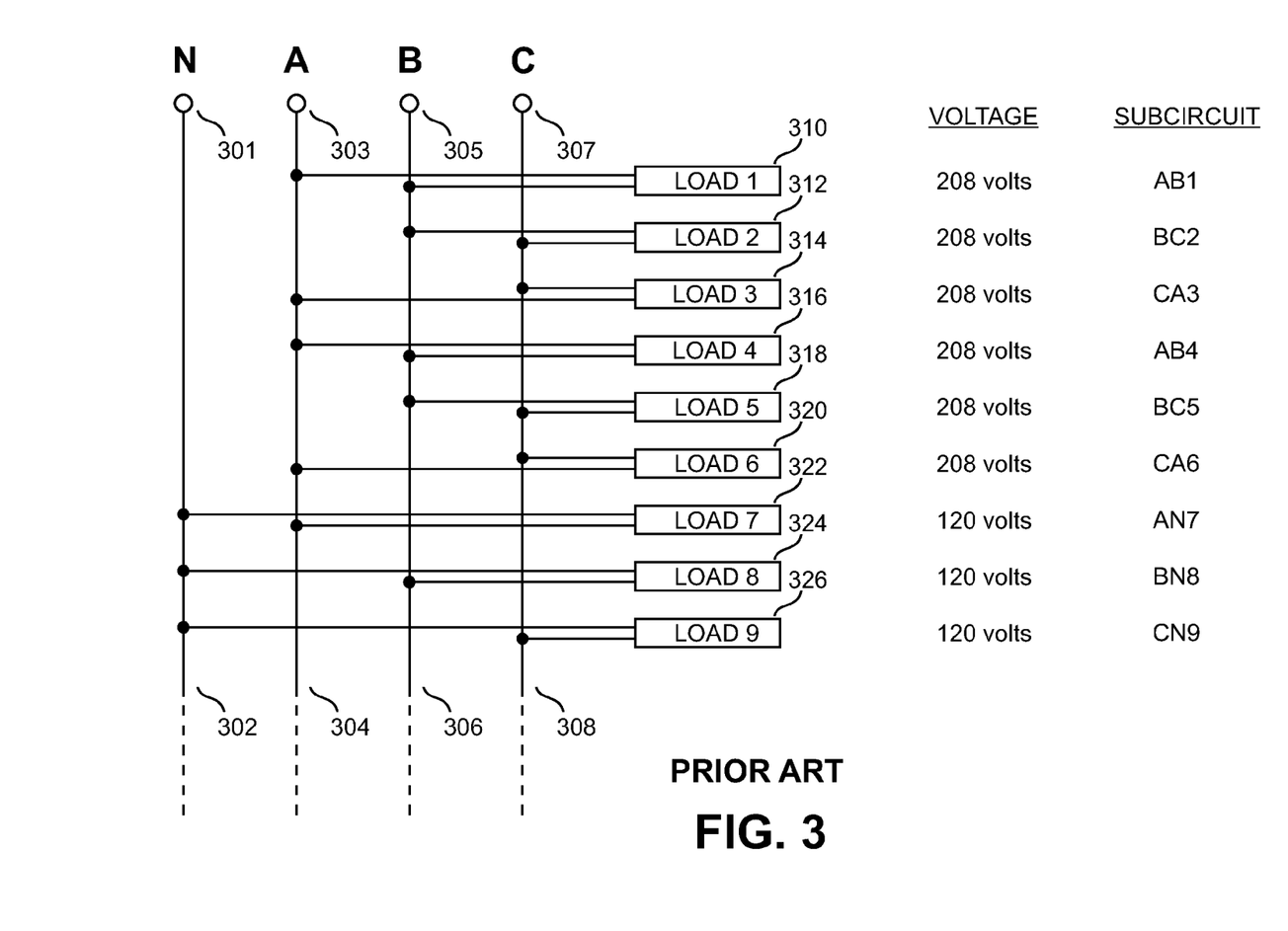
FIG. 3 is a wiring diagram of a three-phase plus neutral electrical distribution system, including example loads variously connected to individual phases.

Similarly, looking to FIG. 2, each of power sources A 303, B 305, and C 307 are connected through loads to another power phase, thereby providing 208 VAC (RMS) in a typical installation in the United States. This circuit configuration is denominated a "delta" circuit configuration. FIG. 2 corresponds electrically to the example of the connection of FIG. 3 loads 1 (310), 2 (312) and 3 (314) between power sources AB, BC, and CA respectively. In the description to follow we will reference the subcircuits with a subscript to indicate the load. For example load 3 (314) may be referred to by $CA_3$ (314). Ideally, the loads (current) are balanced such that the current AB equals the current BC which equals the current CA. In an actual case, any differences in the loads (310, 312, 314) represents a loss of efficiency. FIG. 3 is a more general case in that both wye and delta load configurations are connected to power sources A,B, and C, whereas FIG. 1 and FIG. 2 are examples of specific load connections. That is, FIG. 1 and FIG. 2 are subsets of the general circuit of FIG. 3.

To restate the above statements mathematically:

$$f(\emptyset)=\Sigma_{i=1}{}^n \text{Delta}(\emptyset,i)+\Sigma_{i=1}{}^n Wye(\emptyset,i) \qquad [\text{EQ 1}]$$

where $\emptyset=\{A, B, C\}$ and n=the number of switchable loads.

Ideally, $f(A)=f(B)=f(C)$. If $f(A)\neq f(B)$ or $f(A)\neq f(C)$ or $f(B) \neq f(C)$, inefficiency results. Making the loads equal is the process of rebalancing, as referenced hereinbefore. However, to be able to rebalance, the number of outlets per phase pair (i.e., AB, BC, CA, AN, BN, CN) must be greater than one, otherwise the flexibility to rebalance does not exist.

As will be disclosed hereinafter, an apparatus for selectively connecting a given load terminal with a given power phase line is controlled by a controller, the controller first determining the best combination of connections satisfying the following rules:

a. No power phase may be loaded such that its maximum current value is exceeded.

b. Each load must be provided its required voltage, for example 110 VAC or 208 VAC.

c. The combination of connections satisfying the previous two steps wherein the current differences between the phases is minimized is the combination that is selected for activation.

The controller is provided data, for example by an outside controller, the data including the power requirement of each load and the maximum allowable current of each phase. The controller then determines the current in the bus (for the example of FIG. 3, lines 304, 306, 308) of each phase (see [EQ 1] above) resulting from all combinations of load/phase connections that satisfy the above-stated rules "a." and "b.", then selects that certain combination with the least range for activation by the apparatus. In some embodiments the apparatus includes means for periodically measuring the value of the current demanded by each load, then providing the data to the controller. The controller dynamically rebalances the load configuration according to the most current information provided.

Figure 4:
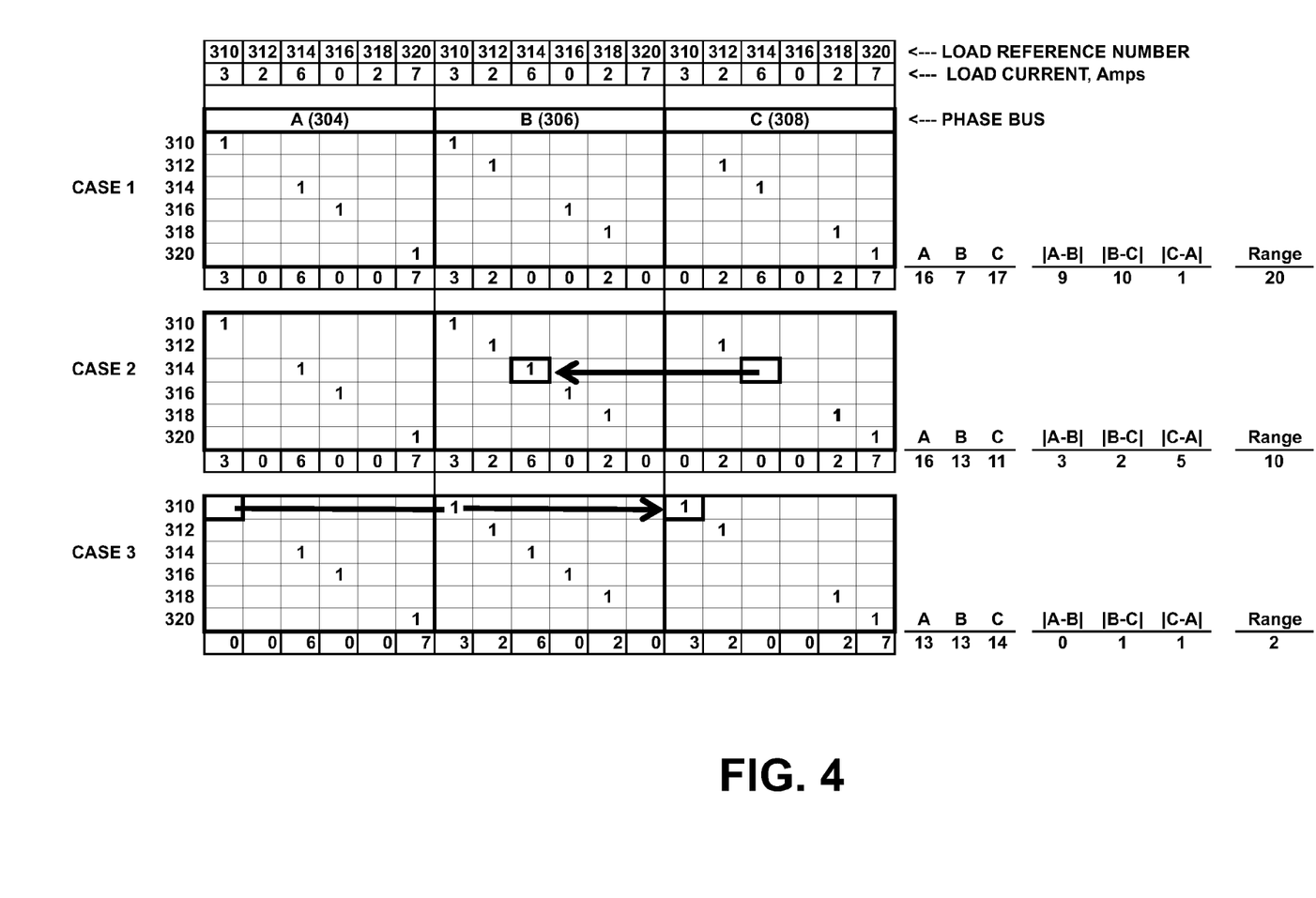
FIG. 4 is an example of finding an optimal circuit loading configuration according to the present invention.

To avoid obscuring the invention with a complex example, consider a simpler example wherein a collection of loads comprising only loads 1,2,3,4,5 and 6 (310 to 320 by twos) from FIG. 3. These loads are all in a delta circuit configuration. Looking to FIG. 4, a tabular representation of the load configuration is shown. Above each of phase bus A (304), B (306), and C (308) table is a table of load reference numbers with their corresponding current values, taken from the example of FIG. 3. In a table below each phase, a "1" value is placed at the intersection of each reference number with itself (left side) to represent a connection of one of the two terminals per load to the phase. For example, in the upper left corner of the set titled "CASE 1" the number one corresponds to the connection of one terminal of load 1 (310) to bus A (304) as shown in FIG. 3. The other connection to load 1 (310) is also indicated by the number one under the table entry for 310 in the B (306) table. The other connections are represented similarly. In each case the current value shown for each load (second line from the top) is multiplied by any intersection that is not zero, the result then at the bottom of the table for the case. Totals for each phase bus (A 304), B (306), and C (308) are shown to the right. So, for example, for Case 1, A=16 amps, B=7 amps, and C=17 amps. Next the absolute values of the differences between each bus pair are found, such as in Case 1 |A–B|=9 amps, |B–C|=10 amps, and |C–A|=1 amp. Finally, the range is found by adding all of the differences; here range=20 amps (9+10+1). Recalling that the efficiency of a delta circuit is attained when the currents are all equal (which would by definition say that the range would be zero), we look for a better arrangement of loads per phase bus to find a lower range value, if there is one.

In some embodiments the optimal solution for loading of the phases is determined by a program whereby all combinations of load vs phase connection are evaluated and the best solution selected for implementation by the apparatus. An example of a C source program for doing this is presented in Appendix I. In the example the requirement "a." above is ignored by the program, the results then examined after the optimum solution is selected from the universe of solutions found. If each phase has the same maximum current value as the other phases the optimum solution will not exceed the maximum on any phase, providing the total system is not being overloaded. In one embodiment the loading on each phase is examined after each iteration and the iteration discarded if the maximum on any phases is exceeded. This embodiment is useful for designs wherein the phase capacity maximum values are not the same for all phases.

So, examining Case 1 (FIG. 4), we take the step of moving a load connection from the highest loaded phase bus, here C (308), to the lowest loaded phase bus, here B (306), the result shown as Case 2. Range has now been improved; a range of 10 amps versus the Case 1 range of 20 amps. Inspection reveals that the highest phase bus is now A (304) and the lowest phase bus is C (308). Load 1 (310) at three amps can have its connection to phase bus A (304) moved to phase bus C (308), as shown in Case 3, resulting in an even lower range of 2. The range of Case 3 is less than any load value, thus cannot be improved upon. For the purpose of illustration, the maximum current value for each phase bus was assumed to be higher than all of the loads combined. For a case wherein that is not true, each case must be evaluated to insure that the maximum current value of a given phase bus is not exceed.

This same methodology may be extended to a different example, a case wherein only the loads 7 (322), 8 (324) and 9 (326) are present. Instead of looking for a low range of current values between buses A, B, and C we are now looking for the condition wherein |A−B|+|B−C|+|C−A|=zero, which will equal the value of the current on the neutral N (302) bus.

Finally, a circuit including a mix of wye and delta loads can be seen to be a combination of these two procedures. As the number of loads increases and the circuit is not a pure wye or a pure delta configuration, the process of determining the best case is more complex. In one embodiment all combinations of load versus phase bus connections that satisfy the requirements of "a." and "b." above are determined and the configuration with the lowest evaluation of [EQ 1] is selected to be implemented.

Figure 5:
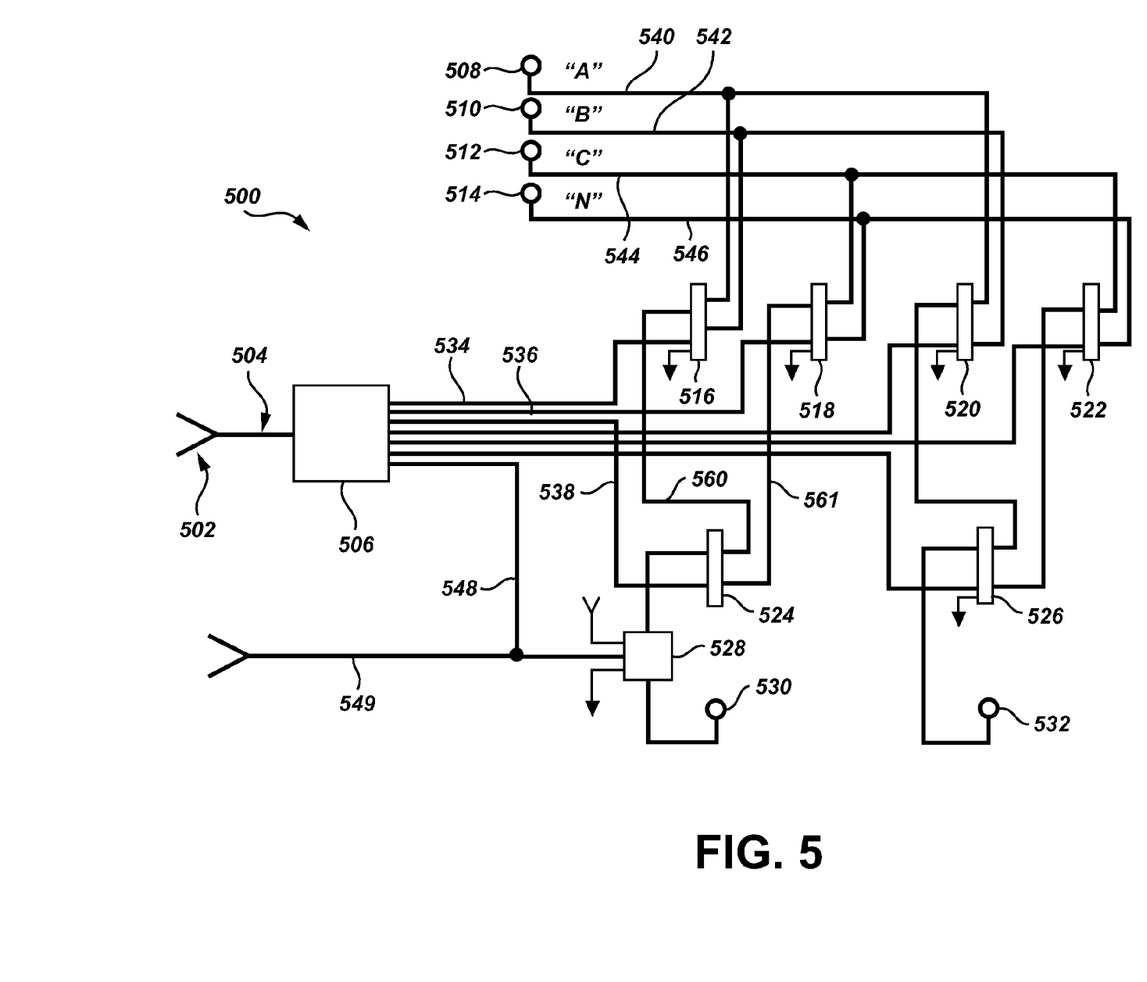
FIG. 5 is an example of an apparatus for connecting a plurality of power output terminals to any of a plurality of power input terminals according to the present invention.

The method of the present invention disclosed hereinbefore may be practiced with the apparatus of the present invention, an apparatus for switching a load or loads amongst power sources. An example according to the present invention is shown in FIG. 5. The method of the present invention may be embodied in a logical device 506, for example a microprocessor, discrete logic, a gate array, an FPGA, a PAL, or other means for performing the logical steps of the method. In the example of FIG. 5, a control box 500 comprises a controller 506 controlling switches with signals on lines as-shown. In the example of FIG. 5, a current sensor 528 provides a variable voltage on a line 548 corresponding to the current through the current sensor 528. The logical device 506 includes means, for example an ADC, for evaluating the value of the sensor 528 output; that is, the voltage on line 548, provided to the controller 506. In one embodiment of the present invention the current sensor 528 includes an ADC, providing a digital word corresponding to the sensed current to the controller 506 wherein the line 548 is then a data bus. The logical device 506 receives commands or parametric data or other data from an external source at an input terminal 502 via a line or bus 504. In one embodiment the output of the current sensor 528 is provided to an external resource, such as an external controller or a computer, on line 549. The external resource provides data or commands to the controller 506, responsive to the value of the data received from the current sensor 528 In some embodiments logical device 506 does not receive commands and is stand-alone when installed.

The example of FIG. 5 illustrates a single load (not shown) connected across two power outlet terminals 530, 532. Either terminal 530, 532 may be selectively connected to power phase "A" at a terminal 508 or a power phase "B" at a terminal 510 or a power phase "C" at a terminal 512 or neutral "N" at a terminal 514. For the purpose of explanation only the connection of terminal 530 to any of the phases (or neutral) will be described. By extension one skilled in the art will understand that the same practice may be employed to selectively connect terminal 532 to a power phase bus or neutral. Likewise, as the load connected across terminals 530, 532 may be flexibly connected, the method of the present invention and the apparatus exemplified by FIG. 5 can be extended to include an arbitrarily greater number of loads.

To control the connections to terminal 530, three switches 516, 518, and 524 are provided. In one embodiment one or more of the switches 516, 518, 524 is replaced with a solid-state device, such as a triac, SCR, or other similar devices (examples not shown). The switch 516 has two input terminals, one terminal connected to terminal 508 by an extension of line 540 and the other terminal connected to terminal 510 by an extension of line 542. The logical device 506 provides a control signal to the switch 516 on line 534, the control signal selecting either the signal from terminal 508 or terminal 510 to be provided on a line 560 from switch 516 to an input terminal of switch 524. Therefore the output term of the switch 516 is (A+B). Similarly, the logical device 506 provides a control signal to the switch 518 on line 536, the control signal selecting either the signal from terminal 512 or terminal 514 to be provided on a line 561 from switch 518 to an input terminal of switch 524. Therefore the output term of the switch 518 is (C+N).

The output signals from switch 516 and switch 518 are thereby provided to the input terminals of the third switch 524. A signal from the logical element 506 on line 538 is provided to the third switch 524, the signal selecting either the term (A+B) or (C+N) to be connected to the output terminal 530. From the above we see that output terminal 530 is arbitrarily connected to any of the power terminals 508, 510, 512 or neutral 514. In particular, the control signals from the logical device 506 may change at any time, thereby changing which power terminal 508, 510, 512, or 514 is connected to output terminal 530.

In a similar manner, logical element 506 controls three additional switches 520, 522, and 526 to provide the signal term (A+B)+(C+N) to power outlet terminal 532. As is now seen, the load across power outlet terminals 530 and 532 may be any arbitrary combination of the available power source phases, enabling implementation of the method of the present invention. Extension to include additional loads, each able to be connected to a given pair of power phase lines (including neutral) will be obvious to one skilled in the art.

Figure 6:
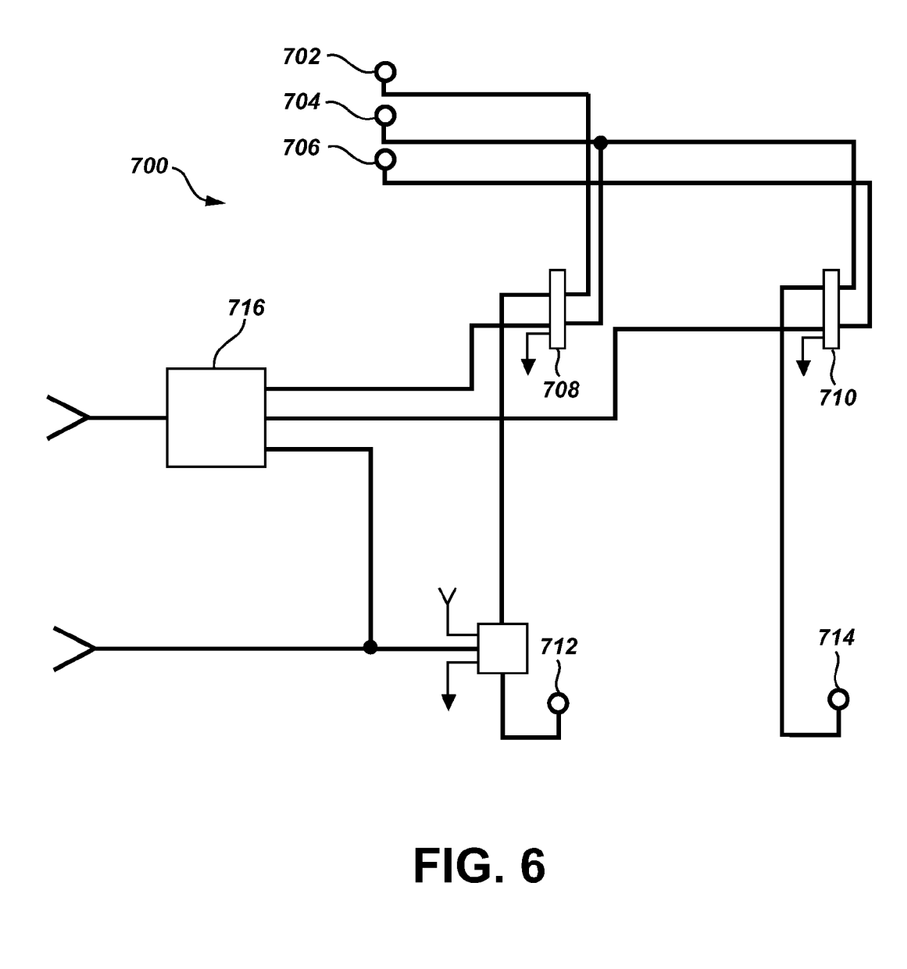
FIG. 6 is an example of an apparatus for connecting a plurality of power output terminals to any of a plurality of power input terminals in a "delta" circuit configuration according to the present invention.

The example of FIG. 5 is a general case, wherein loads in a wye circuit configuration and loads in a delta configuration may be accommodated by the same control box 500. For locations wherein loads are all to be connected in a delta configuration or in a wye configuration a simpler control box 700 may be used. FIG. 6 is an example of an apparatus 700 connecting loads in a delta configuration. The controller 716 provides signals to switch 708 and switch 710 to select any of the power phases 702, 704, 706 for connection to power output terminals 712 and 714. As can be seen from the example schematic, power output terminal 712 may be connected to power phase 701 or 704, whereas power output terminal 714 may be connected to power phase 704 or 706, thus all combinations are provided for. As per the discussion with regards to the example circuit of FIG. 5, more loads may be controlled by the example circuit of FIG. 6 by providing two more switches, connected as are switches 708 and 710, plus two more control lines to the additional switches from the controller 716.

Figure 7:
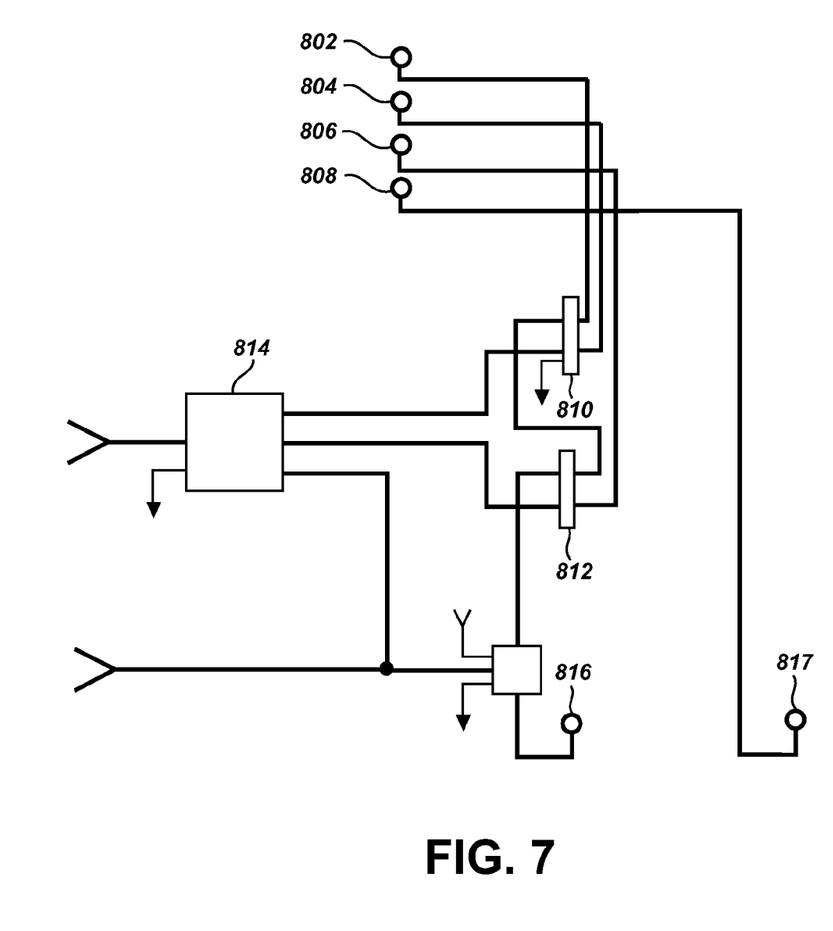
FIG. 7 is an example of an apparatus for connecting a plurality of power output terminals to any of a plurality of power input terminals in a "wye" circuit configuration according to the present invention.

FIG. 7 is an example of a control box 800 for selectively connecting a load to any of the power phases 802, 804, and 806 plus the neutral bus 808, thus forming a wye configuration. The controller 814 provides control signals to switches 810 and 812, thereby selecting any of the three power phases 802, 804, 806 to power output terminal 816. Power output terminal 817 is connected directly to the neutral bus 808. Note that switches 810 and 812 form a three-input OR gate. As in previous examples, extension to additional loads is obvious. The example of FIG. 7 indicates three power lines 802, 804, 806 plus a neutral line 808. In a typical residential installation only two of the three power phases plus the neutral line 808 are provided. For such an installation, only switch 810 is needed. The output of switch 810 connects either power source 802 or power source 804 to output terminal 816; output terminal 817 is connected to neutral 808.

Other embodiments are clear to one skilled in the art. For example the switches, shown in the provided example as relays, may be replaced with power semiconductors, such as SCRs. The discrete examples shown may be replaced with multi-pole, multi-throw relays. Other logical implementations may be advantageous for controlling more loads than illustrated in the example circuits of FIG. 5, FIG. 6, and FIG. 7, all envisioned by the present invention.

COPYRIGHT NOTICE

A portion of the disclosure of this disclosure contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

APPENDIX I

```
#include <math.h>
#include <stdio.h>
#include <stdlib.h>
#include <strings.h>
/*
 * Macro definitions
 */
#define NUM_LOADS (6)
/*
 * Data structures
 */
typedef enum {
    DELTA = 0,
    WYE,
    NUM_LOAD_TYPES
} load_t;
typedef enum {
    AB = 0,
    BC,
    CA,
    AN,
    BN,
    CN,
    NUM_PHASE_PAIRS
} phase_pairs;
typedef struct_load {
    int             load_id;
    float           current;
    load_t          load_type;
} load;
typedef struct_wiring {
    phase_pairs schema[NUM_LOADS + 1];
    float           load_in_a;
    float           load_in_b;
    float           load_in_c;
} wiring;
/*
 * Global variables
 */
load        all_loads[NUM_LOADS + 1];
float       best_heuristic;
wiring      best_config;
/*
 * Performs a heuristic analysis of the given wiring configuration
 * and compares it to the best known configuration found so far.
 *
 * Parameters:
 *   config - the wiring schema being analyzed
 */
void analyze_wiring_config(wiring config) {
    float heuristic;
    float diff_ab;
    float diff_bc;
    float diff_ca;
    int   load_id;
    /* Compute the heuristic value to determine the distance
     * from the ideal condition. */
    diff_ab = fabsf(config.load_in_a - config.load_in_b);
    diff_bc = fabsf(config.load_in_b - config.load_in_c);
    diff_ca = fabsf(config.load_in_c - config.load_in_a);
    heuristic = diff_ab + diff_bc + diff_ca;
    /* Print the current configuration for posterity */
    for ( load_id =1; load_id <= NUM_LOADS; load_id++ ) {
        switch ( config.schema[load_id] ) {
            case AB:
                printf("AB");
                break;
            case BC:
                printf("BC");
                break;
            case CA:
                printf("CA");
                break;
            case AN:
                printf("AN");
                break;
            case BN:
                printf("BN");
                break;
            case CN:
                printf("CN");
                break;
        }
        printf("\t");
    }
    printf("%.1f\t", config.load_in_a);
    printf("%.1f\t", config.load_in_b);
    printf("%.1f\t", config.load_in_c);
    printf("%.1f\n", heuristic);
    /* Keep track of our best configuration */
    if ( heuristic < best_heuristic ) {
        best_config = config;
        best_heuristic = heuristic;
    }
}
/*
 * Recurses through all possible combinations of the wiring schema.
 *
 * Parameters:
 *   load_id - the unique identifier of the load being analyzed
 *   config - the current combination of the wiring schema being analyzed
 */
void search_wiring_config(int load_id, wiring config) {
    wiring left_branch;
    wiring center_branch;
    wiring right_branch;
    load_t load_type;
    float current;
    int   next_load_id;
    /* Terminate the search when we have no more loads
     * in this branch to analyze. */
    if ( load_id > NUM_LOADS ) {
        analyze_wiring_config(config);
        return;
    }
    /* Initialize the properties for the current load to analyze */
    load_type = all_loads[load_id].load_type;
    current = all_loads[load_id].current;
    /* Determine the next load to analyze */
    next_load_id = load_id + 1;
    /* Setup the search parameters for the next load */
    switch ( load_type ) {
        case DELTA:
            left_branch = config;
            left_branch.schema[load_id] = AB;
            left_branch.load_in_a += current;
            left_branch.load_in_b += current;
            center_branch = config;
            center_branch.schema[load_id] = BC;
            center_branch.load_in_b += current;
            center_branch.load_in_c += current;
            right_branch = config;
            right_branch.schema[load_id] = CA;
            right_branch.load_in_c += current;
            right_branch.load_in_a += current;
            break;
        case WYE:
            left_branch = config;
            left_branch.schema[load_id] = AN;
            left_branch.load_in_a += current;
            center_branch = config;
            center_branch.schema[load_id] = BN;
            center_branch.load_in_b += current;
            right_branch = config;
            right_branch.schema[load_id] = CN;
            right_branch.load_in_c += current;
```

APPENDIX I-continued

```
      break;
   }
   /* Search starting at the next load for each possible branch */
   search_wiring_config(next_load_id, left_branch);
   search_wiring_config(next_load_id, center_branch);
   search_wiring_config(next_load_id, right_branch);
}
/*
 * Measures the current for the given load and sets the properties of that
 * load. The simulator uses a randomized value for both current and load
 * type, but can easily be replaced to read the actual current value from
 * a CT coil, Hall Effect sensor, or other current-sensing device.
 *
 * Parameters:
 *    load_id - the unique identifier for the load being measured
 *
 * Returns:
 *    the current measured in the load
 */
float measure_load(int load_id) {
   float current;
   int type;
   /* Output loads from 0.0A to 10.0A */
   current = rand( ) % 100;
   current /= 10.0;
   /* The type is either DELTA or WYE */
   type = rand( ) % 2;
   all_loads[load_id].current = current;
   all_loads[load_id].load_type = type;
   return all_loads[load_id].current;
}
/*
 * The main initialization code that starts the program.
 */
int main(void) {
   wiring config;
   float current;
   int    load_id;
   /* Initialize any global variables */
   best_heuristic = INFINITY;
   /* Initialize the random number generator */
   srand( (unsigned int)time(NULL) );
   /* Gather the properties of all loads (current, type, etc.) */
   for ( load_id = 1; load_id <= NUM_LOADS; load_id++ ) {
      current = measure_load(load_id);
      printf("Load %d", load_id);
      printf("\t");
      printf("%.1f", current);
      printf("\t");
      switch ( all_loads[load_id].load_type ) {
         case DELTA:
            printf("%s", "DELTA");
            break;
         case WYE:
            printf("%s", "WYE");
            break;
      }
      printf("\n");
   }
   printf("\n\n");
   /* Print column headers for the search output */
   for ( load_id = 1; load_id <= NUM_LOADS; load_id++ ) {
      printf("Load %d", load_id);
      printf("\t");
   }
   printf("Current in A");
   printf("\t");
   printf("Current in B");
   printf("\t");
   printf("Current in C");
   printf("\t");
   printf("Heuristic");
   printf("\n");
   /* Start the search */
   config.load_in_a = 0.0;
   config.load_in_b = 0.0;
   config.load_in_c = 0.0;
   search_wiring_config(1, config);
   /* Print the best results */
   printf("\n");
   printf("Best configuration:\n");
   analyze_wiring_config(best_config);
   return EXIT_SUCCESS;
}
```

What is claimed is:

1. An apparatus for arbitrarily connecting a load across two output terminals wherein any one of the two output terminals is connected to any of a selected one of a plurality of polyphase power sources, comprising:
   a controller comprising:
      one or more sets of output terminals, each set comprising a first output terminal and a second output terminal; and
      means for providing a control signal to the first output terminal and to the second output terminal of each output terminal set;
   one or more pair of switches, each pair of switches comprising:
      a first switch, comprising:
         a first input terminal for receiving a control signal on a line from the first output terminal of a given controller output terminal set;
         a second input terminal for receiving a signal on a line from a first power source;
         a third input terminal for receiving a signal on a line from a second power source; and
         an output terminal;
      a second switch, comprising:
         a first input terminal for receiving a control signal on a line from the second output terminal of the given controller output terminal set;
         a second input terminal for receiving a signal on a line from the second power source;
         a third input terminal for receiving a signal on a line from a third power source; and
         an output terminal, wherein an electrical load is connected between the output terminal of the first switch and the output terminal of the second switch.

2. The apparatus according to claim 1, further comprising:
   a current sensor connected in series between the output terminal of at least one switch of a switch pair and the load, the current sensor including an output terminal wherein the output terminal provides a signal, wherein a value of the signal is related to a value of current passing through the current sensor, and
   an input terminal on the controller for receiving the signal from the output terminal of the current sensor on a line.

3. The apparatus according to claim 1, further comprising:
   a current sensor connected in series between the output terminal of at least one switch of a switch pair and the load, the current sensor including an output terminal wherein the output terminal provides a signal on a line to an external device, wherein a value of the signal is related to a value of current passing through the current sensor.

4. The apparatus according to claim 1, further including an input terminal on the controller for receiving signals from an external device on a line.

5. The apparatus according to claim 4, wherein the signal provides a command to the controller.

6. The apparatus according to claim 4 wherein the signal provides data to the controller.

7. An apparatus for arbitrarily connecting a load across any of a selected one of a plurality of polyphase power sources and an electrically neutral line, comprising:
a controller comprising:
one or more sets of output terminals, each set comprising a first output terminal and a second output terminal; and
means for providing a control signal to the first output terminal and to the second output terminal of each output terminal set;
one or more pair of switches, each pair of switches comprising:
a first switch, comprising:
a first input terminal for receiving a control signal on a line from the first output terminal of a given controller output terminal set;
a second input terminal for receiving a signal on a line from a first power source;
a third input terminal for receiving a signal on a line from a second power source; and
an output terminal;
a second switch, comprising:
a first input terminal for receiving a control signal on a line from the second output terminal of the given controller output terminal set;
a second input terminal for receiving a signal on a line from a third power source;
a third input terminal for receiving a signal on a line from the output terminal of the first switch; and
an output terminal, wherein an electrical load is connected between the output terminal of the second switch and a fourth power source, wherein the fourth power source is electrically neutral with respect to the first, second, and third power sources.

8. The apparatus according to claim 7, further comprising:
a current sensor connected in series between the output terminal of at least one switch of a switch pair and the load, the current sensor including an output terminal wherein the output terminal provides a signal, wherein a value of the signal is related to a value of current passing through the current sensor, and
an input terminal on the controller for receiving the signal from the output terminal of the current sensor on a line.

9. The apparatus according to claim 7, further comprising:
a current sensor connected in series between the output terminal of at least one switch of a switch pair and the load, the current sensor including an output terminal wherein the output terminal provides a signal on a line to an external device, wherein a value of the signal is related to a value of current passing through the current sensor.

10. The apparatus according to claim 7, further including an input terminal on the controller for receiving signals from an external device on a line.

11. The apparatus according to claim 10, wherein the signal provides a command to the controller.

12. The apparatus according to claim 10 wherein the signal provides data to the controller.

13. An apparatus for arbitrarily connecting a load across two output terminals wherein any one of the two output terminals is connected to any of a selected one of a plurality of polyphase power sources, comprising:
a controller comprising:
one or more sets of output terminals, each set comprising a first output terminal, a second output terminal, a third output terminal, a fourth output terminal, a fifth output terminal, and a sixth output terminal; and
means for providing a control signal to the first output terminal, the second output terminal, the third output terminal, the fourth output terminal, the fifth output terminal, and the sixth output terminal; and
one or more sets of switches, each set of switches comprising:
a first switch, comprising:
a first input terminal for receiving a control signal on a line from the first output terminal of a given controller output terminal set;
a second input terminal for receiving a signal on a line from a first power source;
a third input terminal for receiving a signal on a line from a second power source; and
an output terminal;
a second switch, comprising:
a first input terminal for receiving a control signal on a line from the second output terminal of the given controller output terminal set;
a second input terminal for receiving a signal on a line from a third power source;
a third input terminal for receiving a signal on a line from a fourth power source; and
an output terminal;
a third switch, comprising:
a first input terminal for receiving a control signal on a line from the third output terminal of the given controller output terminal set;
a second input terminal for receiving a signal on a line from the first power source;
a third input terminal for receiving a signal on a line from the second power source; and
an output terminal;
a fourth switch, comprising:
a first input terminal for receiving a control signal on a line from the fourth output terminal of the given controller output terminal set;
a second input terminal for receiving a signal on a line from the third power source;
a third input terminal for receiving a signal on a line from the fourth power source; and
an output terminal;
a fifth switch, comprising:
a first input terminal for receiving a control signal on a line from the fifth output terminal of the given controller output terminal set;
a second input terminal for receiving a signal on a line from the output terminal of the first switch;
a third input terminal for receiving a signal on a line from the output terminal of the second switch; and
an output terminal; and
a sixth switch, comprising:
a first input terminal for receiving a control signal on a line from the sixth output terminal of the given controller output terminal set;
a second input terminal for receiving a signal on a line from the output terminal of the third switch;
a third input terminal for receiving a signal on a line from the output terminal of the fourth switch; and
an output terminal, wherein an electrical load is connected between the output terminal of the fifth switch and the output terminal of the sixth switch.

14. The apparatus according to claim 13, further comprising:

a current sensor connected in series between the output terminal of at least one switch of a switch pair and the load, the current sensor including an output terminal wherein the output terminal provides a signal, wherein a value of the signal is related to a value of current passing through the current sensor, and an input terminal on the controller for receiving the signal from the output terminal of the current sensor on a line.

15. The apparatus according to claim 13, further including an input terminal on the controller for receiving signals from an external device on a line.

16. The apparatus according to claim 15, wherein the signal provides a command to the controller.

17. The apparatus according to claim 15, wherein the signal provides data to the controller.

18. The apparatus according to claim 13, wherein one of the power sources is electrically neutral with respect to the three other power sources.

19. The apparatus according to claim 13, further comprising:

a current sensor connected in series between the output terminal of at least one switch of a switch pair and the load, the current sensor including an output terminal wherein the output terminal provides a signal on a line to an external device, wherein a value of the signal is related to a value of current passing through the current sensor.

* * * * *